US009322558B2

(12) United States Patent
Ramier et al.

(10) Patent No.: US 9,322,558 B2
(45) Date of Patent: Apr. 26, 2016

(54) COMBUSTOR APPARATUS IN A GAS TURBINE ENGINE

(71) Applicants: Stephen A. Ramier, Fredericton (CA); David J. Wiebe, Orlando, FL (US); Lawrence P. Budnick, Merritt Island, FL (US); Mark L. Adamson, Orlando, FL (US); Daniel W. Garan, Chuluota, FL (US); Robert H. Bartley, Oviedo, FL (US); Yadollah Naghian, Waxhaw, NC (US)

(72) Inventors: Stephen A. Ramier, Fredericton (CA); David J. Wiebe, Orlando, FL (US); Lawrence P. Budnick, Merritt Island, FL (US); Mark L. Adamson, Orlando, FL (US); Daniel W. Garan, Chuluota, FL (US); Robert H. Bartley, Oviedo, FL (US); Yadollah Naghian, Waxhaw, NC (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 435 days.

(21) Appl. No.: 13/928,476

(22) Filed: Jun. 27, 2013

(65) Prior Publication Data

US 2015/0000283 A1 Jan. 1, 2015

(51) Int. Cl.
*F23R 3/60* (2006.01)
*F23R 3/28* (2006.01)
*F23R 3/54* (2006.01)
*F16L 19/06* (2006.01)
*F23R 3/34* (2006.01)

(52) U.S. Cl.
CPC ............... *F23R 3/283* (2013.01); *F16L 19/061* (2013.01); *F23R 3/286* (2013.01); *F23R 3/346* (2013.01); *F23R 3/54* (2013.01); *F23R 3/60* (2013.01); *F23R 3/34* (2013.01)

(58) Field of Classification Search
CPC ............ F23R 3/283; F23R 3/286; F23R 3/34; F23R 3/346; F23R 3/60
See application file for complete search history.

(56) References Cited

U.S. PATENT DOCUMENTS

| 3,311,392 | A | 3/1967 | Buschow |
| 4,037,864 | A | 7/1977 | Anderson et al. |
| 4,798,404 | A | 1/1989 | Iyanicki |
| 4,826,218 | A | 5/1989 | Zahuranec |
| 5,279,112 | A * | 1/1994 | Halila ................. F02M 37/0017 285/13 |
| 6,189,321 | B1 | 2/2001 | Banhardt et al. |
| 6,711,898 | B2 | 3/2004 | Laing et al. |
| 7,107,773 | B2 | 9/2006 | Little |
| 7,810,336 | B2 | 10/2010 | Moraes |
| 7,966,819 | B2 | 6/2011 | Bishara et al. |
| 8,210,211 | B2 | 7/2012 | McMasters et al. |
| 8,312,727 | B2 | 11/2012 | Bishara et al. |
| 2008/0245901 | A1 | 10/2008 | Bishara et al. |

(Continued)

FOREIGN PATENT DOCUMENTS

FR 1186524 A 8/1959
FR 2886370 A1 12/2006

*Primary Examiner* — Phutthiwat Wongwian
*Assistant Examiner* — Marc Amar

(57) ABSTRACT

A combustor apparatus defining a combustion zone where air and fuel are burned to create high temperature combustion products. The combustor apparatus comprises an outer wall including a fuel inlet opening for receiving a fuel feed pipe. A coupling assembly is engaged with the fuel feed pipe at the fuel inlet opening to attach the fuel feed pipe to the outer wall. A fuel injection system is located in the interior volume of the outer wall and comprises fuel supply structure including a fuel feed block having a fuel intake passage aligned with the outlet portion of the fuel feed pipe. A coupling fastener is engaged against an exterior outer face of the fuel feed block to create a sealed coupling for containing fuel passing from the fuel feed pipe into the fuel feed block, and to secure the fuel feed block relative to the coupling assembly.

16 Claims, 8 Drawing Sheets

(56) References Cited

U.S. PATENT DOCUMENTS

| | | |
|---|---|---|
| 2011/0056206 A1 | 3/2011 | Wiebe |
| 2011/0154824 A1 | 6/2011 | Fiebig et al. |
| 2011/0289928 A1 | 12/2011 | Fox et al. |
| 2012/0204575 A1 | 8/2012 | Carlisle |
| 2014/0245740 A1* | 9/2014 | Wiebe ............... F02C 7/222 60/740 |

* cited by examiner

COMBUSTOR APPARATUS IN A GAS TURBINE ENGINE

FIELD OF THE INVENTION

The present invention relates to a combustor apparatus in a gas turbine engine, and, more particularly, to a combustor apparatus that includes a fuel feed pipe and fuel feed block with a coupling fastener engaging the fuel feed block to maintain a sealed coupling between the fuel feed pipe and the fuel feed block.

BACKGROUND OF THE INVENTION

In gas turbine engines, fuel is delivered from one or more fuel sources to a combustion section including one or more combustor apparatuses where the fuel is mixed with air and ignited to generate hot combustion products defining working gases. The working gases are directed from the combustion section to a turbine section. Each combustion apparatus may comprise one or more stages, each stage supplying fuel to be ignited within the respective combustor apparatus.

SUMMARY OF THE INVENTION

In accordance with a first aspect of the present invention, a combustor apparatus is provided in a gas turbine engine. The combustor apparatus defines a combustion zone where air and fuel are burned to create high temperature combustion products. The combustor apparatus comprises an outer wall including an inner face and an outer face, and defining an interior volume and comprising a fuel inlet opening. A fuel feed pipe extends through the fuel inlet opening in the outer wall, the fuel feed pipe including an inlet portion and an outlet portion. A coupling assembly comprises coupling structure on the outer face of the outer wall adjacent to the fuel inlet opening, the coupling structure comprising a threaded inner coupling portion. The coupling assembly additionally includes a fitting member disposed about and engaged with the inlet portion of the fuel feed pipe and comprising a threaded outer coupling portion. The threaded outer coupling portion is threadedly engaged with the inner coupling portion of the coupling structure to create a first sealed coupling with the coupling structure, and to secure the fuel feed pipe relative to the outer wall. A fuel injection system is at least partially located in the interior volume of the outer wall and comprises fuel supply structure for providing fuel to at least one fuel injector that delivers fuel to be burned in the combustion zone. The fuel supply structure comprises a fuel feed block including a fuel intake passage aligned with the outlet portion of the fuel feed pipe, and an exterior surface defining oppositely facing inner and outer faces, the inner face of the fuel feed block being located facing toward the inner face of the outer wall. A coupling fastener is engaged against the outer face of the fuel feed block to create a second sealed coupling adjacent to the outlet portion of the fuel feed pipe for containing fuel passing from the fuel feed pipe into the fuel feed block, and to secure the fuel feed block relative to the coupling assembly.

In accordance with another aspect of the invention, a combustor apparatus is provided in a gas turbine engine. The combustor apparatus defines a combustion zone where air and fuel are burned to create high temperature combustion products, the combustor apparatus comprises an outer wall including an inner face and an outer face, and defining an interior volume and comprising a fuel inlet opening. A fuel feed pipe extends through the fuel inlet opening in the outer wall, the fuel feed pipe including an inlet portion and an outlet portion. A coupling connection connecting the fuel feed pipe to the outer wall to create a seal between the fuel feed pipe and the outer wall, and to secure the fuel feed pipe relative to the outer wall. A fuel injection system is at least partially located in the interior volume of the outer wall and comprises fuel supply structure for providing fuel to at least one fuel injector that delivers fuel to be burned in the combustion zone. The fuel supply structure comprises a fuel feed block including a main body and a flange portion extending outwardly from the main body and having opposing sides defining inner and outer faces of the fuel feed block. The flange portion further includes a plurality of holes. A fuel intake passage is formed in the main body and is aligned with the outlet portion of the fuel feed pipe. A plurality of threaded holes extend into the outer wall from the inner face thereof, and a plurality of bolts extend through the holes in the flange portion of the fuel feed block into engagement with the threaded holes to create a sealed coupling adjacent to the outlet portion of the fuel feed pipe for containing fuel passing from the fuel feed pipe into the fuel feed block, and to secure the fuel feed block to the outer wall.

In accordance with a further aspect of the invention, a combustor apparatus is provided in a gas turbine engine. The combustor apparatus defines a combustion zone where air and fuel are burned to create high temperature combustion products, the combustor apparatus comprises an outer wall including an inner face and an outer face, and defining an interior volume and comprising a fuel inlet opening. A fuel feed pipe extends through the fuel inlet opening in the outer wall, the fuel feed pipe including an inlet portion and an outlet portion, and a shoulder portion extending outwardly from the outlet portion. A coupling connection connecting the fuel feed pipe to the outer wall to create a seal between the fuel feed pipe and the outer wall, and to secure the fuel feed pipe relative to the outer wall. A fuel injection system is at least partially located in the interior volume of the outer wall and comprises fuel supply structure for providing fuel to at least one fuel injector that delivers fuel to be burned in the combustion zone. The fuel supply structure comprises a fuel feed block including a fuel intake passage aligned with the outlet portion of the fuel feed pipe, and an exterior surface defining oppositely facing inner and outer faces, the inner face of the fuel feed block being located facing toward the inner face of the outer wall. A coupling fastener is engaged against the outer face of the fuel feed block. The coupling fastener provides a clamping force at a junction between the shoulder portion on the fuel feed pipe and the inner face of the fuel feed block at the fuel intake passage to create a sealed coupling adjacent to the outlet portion of the fuel feed pipe for containing fuel passing from the fuel feed pipe into the fuel feed block, and to secure the fuel feed block relative to the fuel feed pipe.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
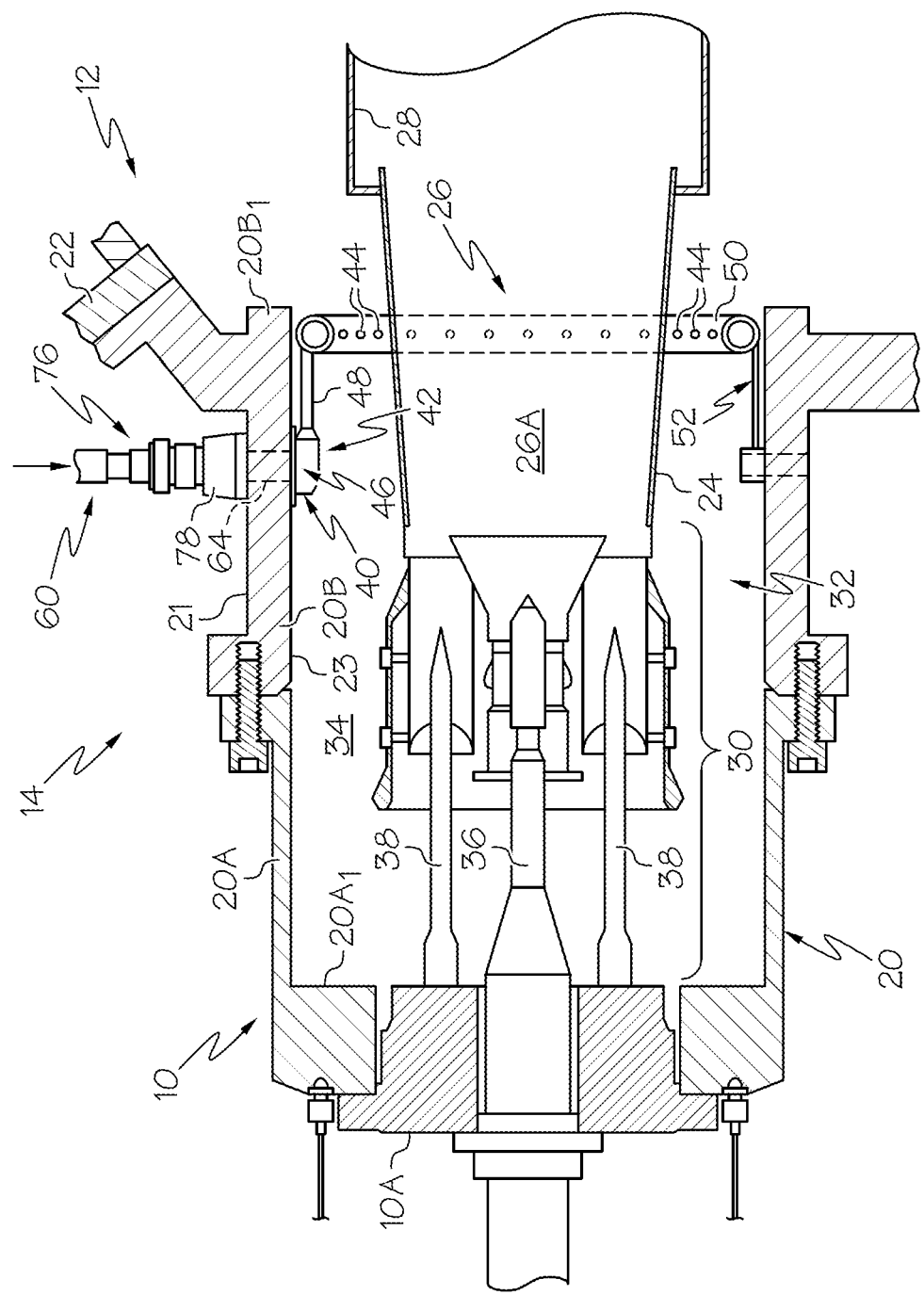
FIG. 1 is a schematic cross sectional view of a combustor apparatus for use in a gas turbine engine according to an embodiment of the invention.

Referring to FIG. 1, a combustor apparatus 10 for use in a combustion section 12 of a gas turbine engine 14 is schematically shown. The combustor apparatus 10 illustrated in FIG. 1 may form part of a can-annular combustion section 12, which may comprise an annular array of combustor apparatuses 10 similar to the one illustrated in FIG. 1 and described herein. The combustor apparatus 10 is provided to burn fuel and compressed air from a compressor section (not shown) to create hot combustion products defining a hot working gas that is provided to a turbine section (not shown) where the working gas is expanded to provide rotation of a turbine rotor (not shown) and to provide output power, which may be used to produce electricity.

The combustor apparatus 10 illustrated in FIG. 1 comprises an outer wall 20, also known as a combustor shell or a portal wall, coupled to an engine casing 22, a liner 24 that defines a combustion zone 26 where fuel and compressed air are mixed and burned to create the combustion products, a transition duct 28 coupled to the liner 24 for delivering the combustion products to the turbine section, and a main fuel injection system 30 that is provided to deliver fuel into a main burn zone 26A of the combustion zone 26.

The outer wall 20 in the embodiment shown comprises a generally cylindrical member having outer and inner faces 21, 23, and defines an interior volume 32. An outer portion of the interior volume 32 between the outer wall 20 and the liner 24 defines an air flow passageway 34 through which the compressed air to be delivered into the combustion zone 26 flows. The outer wall 20 includes a first section 20A that includes a first end $20A_1$ located at a head end 10A of the combustor apparatus 10, and a second section 20B that is connected to the first section 20A, e.g., by bolting, and includes a second end $20B_1$ distal from the first end $20A_1$ and that is coupled to the engine casing 22.

In the illustrated embodiment, the main fuel injection system 30 comprises a central pilot fuel injector 36 and an annular array of main fuel injectors 38 disposed about the pilot fuel injector 36. However, the main fuel injection system 30 could include other configurations without departing from the spirit and scope of the invention. The pilot fuel injector 36 and the main fuel injectors 38 each deliver fuel into the main burn zone 26A of the combustion zone 26 during operation of the engine 14.

The combustor apparatus 10 illustrated in FIG. 1 further comprises a pre-mixing fuel injection assembly 40, also known as a C-stage fuel injection system, at least a portion of which is located in the interior volume 32 of the outer wall 20 between the outer wall 20 and the liner 24. The pre-mixing fuel injection assembly 40 delivers an amount of fuel into the air passing through the air flow passageway 34, which is located upstream from the combustion zone 26, i.e., the pre-mixing fuel injection assembly 40 delivers fuel upstream from the main burn zone 26A of the combustion zone 26.

The pre-mixing fuel injection system 40 comprises fuel supply structure 42 and a plurality of fuel injectors 44 that receive fuel from the fuel supply structure 42 and inject the fuel into the air passing through the air flow passageway 34. While the fuel injectors 44 are illustrated in FIG. 1 as openings formed in an annular fuel ring 50, the fuel injectors 44 could comprise any suitable type of fuel injectors.

The fuel supply structure 42 in the embodiment shown comprises a fuel feed block 46, a fuel supply tube 48, and an annular fuel ring 50, which delivers fuel to the fuel injectors 44. The fuel ring 50 may be supported via a plurality of ring supports 52 (only one shown in FIG. 1) connected to the outer wall 20, which ring supports 52 may be provided at intervals about the circumference of the fuel ring 50.

The combustor apparatus 10 additionally comprises a fuel feed assembly 60 for delivering fuel to the pre-mixing fuel injection system 40. The fuel feed assembly 60 comprises a fuel feed pipe 62 that extends through a fuel inlet opening 64 in the outer wall 20, wherein the fuel feed pipe 62 includes an inlet portion 66 located outwardly from the outer face 21 of the outer wall 20, and an outlet portion 68 located inwardly from the outer face 21 of the outer wall 20. The fuel feed pipe 62 typically may comprise a material such as stainless steel. For example, the fuel feed pipe may comprise AISI 304, AISI 316, AISI 347 or other similar stainless steels. Such stainless steels typically have about 17-25% chromium content by mass, and 8-15% nickel content by mass.

The fuel feed block 46 comprises a material selected to withstand the high temperatures within the combustor apparatus 10. The material of the fuel feed block 46 may comprise a nickel-based metal alloy, such as, for example, an INCONEL alloy (INCONEL is a registered trademark of Special Metals Corporation), such as INCONEL 625, INCONEL 617, or INCONEL 600, or a HASTELLOY alloy (HASTELLOY is a registered trademark of Haynes International, Inc.), such as HASTELLOY X. While material of the fuel feed block 46 preferably comprises at least about 45% nickel by mass, other types of metals or metal alloys could be used, such as, for example, chromium-based metal alloys, or a high strength stainless steel, such as AISI 410.

The fuel feed block 46 includes a fuel inlet passage 54 (FIG. 2) that is aligned with the fuel inlet passage 64 and the fuel feed pipe 62. The fuel feed pipe 62 is coupled to the outer wall 20, such as by a coupling assembly 61 coupling the fuel feed pipe 62 to the outer wall 20, and the fuel feed block 46 is supported by means of a coupling fastener engaged against an exterior surface of the fuel feed block 46, as will be described in detail below.

Figure 2:
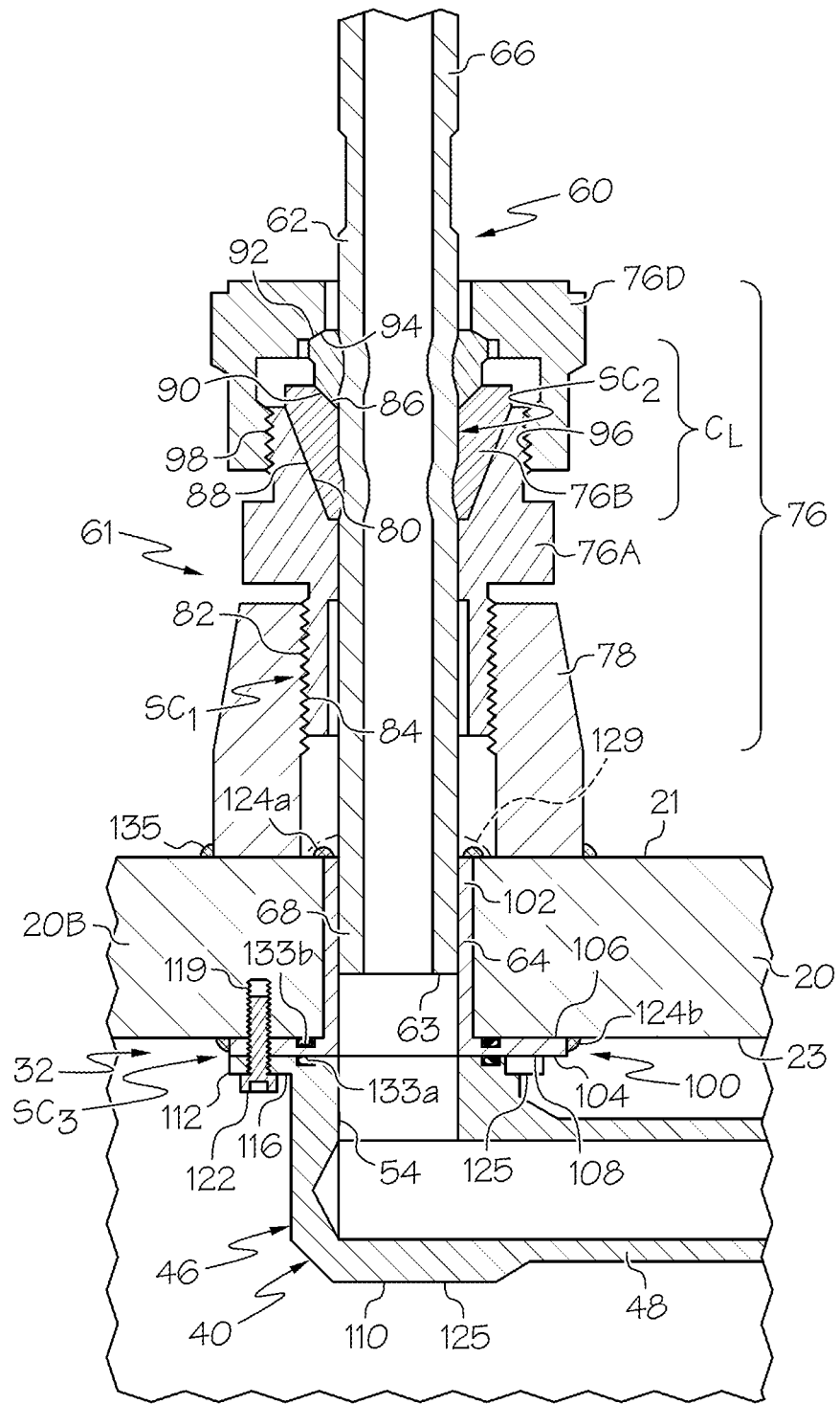
FIG. 2 is a side cross sectional view of a portion of the combustor apparatus of FIG. 1.

As seen in FIG. 2, the outlet portion 68 of the fuel feed pipe 62 extends inward past the outer face 21 of the outer wall 20 to a location where an end 63 of the fuel feed pipe 62 is between the outer and inner faces 21, 23, i.e., within fuel inlet opening 64. Further, a fitting member 76 is disposed about and engaged with a portion of the inlet portion 66 of the fuel feed pipe 62, and coupling structure comprising a coupling member 78 is affixed to the outer face 21 of the outer wall 20 adjacent to the fuel inlet opening 64, and is preferably affixed at a weld joint 135. The fitting member 76 and coupling member 78 may comprise a stainless steel material and form the coupling assembly 61.

The fitting member 76 comprises four pieces 76A-D. The first piece 76A comprises a sloped inner surface 80 and a threaded outer coupling portion 82 that is threadedly engaged with an inner coupling portion 84 of the coupling member 78 to create a first sealed coupling $SC_1$. The second piece 76B comprises a sloped inner surface 86 and a sloped outer surface 88 that slides along the sloped inner surface 80 of the first piece 76A during a compression fitting installation as will be discussed herein. The third piece 76C comprises first and second sloped outer surfaces 90, 92, wherein the first sloped surface 90 slides along the sloped inner surface 86 of the second piece 76B and the second sloped surface 92 slides along a sloped inner surface 94 of the fourth piece 76D during the compression fitting installation. The fourth piece 76D also comprises a threaded section 96 that threadedly engages a threaded section 98 of the first piece 76A during the compression fitting installation, which will now be described.

During the compression fitting installation, the first piece 76A of the fitting member 76 according to this embodiment of the invention is coupled to the coupling member 78 by threading the threaded outer coupling portion 82 of the first piece 76A of the fitting member 76 to the inner coupling portion 84 of the coupling member 78. Thereafter, with the second and third pieces 76B, 76C of the fitting member 76 disposed between the first and fourth pieces 76A, 76D, the fourth piece 76D is coupled to the first piece 76 by threading the threaded section 96 of the fourth piece 76D to threaded section 98 of the first piece 76A. As this step is performed, the respective sloped surfaces 80, 86, 88, 90, 92, 94 slide along one another to force the second and third pieces 76B, 76C of the fitting member 76 toward the inlet portion 66 of the fuel feed pipe 62, which inlet portion 66 is eventually structurally deformed by the second and third pieces 76B, 76C at the clamping location $C_L$ to clamp the fuel feed pipe 62 in place and to create a second sealed coupling $SC_2$, thus effecting the compression fitting.

The compression fitting between the fitting member 76 and the coupling member 78 creates the first sealed coupling $SC_1$ and structurally secures the fuel feed assembly 60 relative to the outer wall 20, and the fitting member 76 additionally creates the second sealed coupling $SC_2$ between the fitting member 76 and the fuel feed pipe 62. Additional details in connection with a similar type of compression fitting can be found in U.S. Pat. No. 4,826,218, the entire disclosure of which is hereby incorporated by reference herein.

Figure 2A:
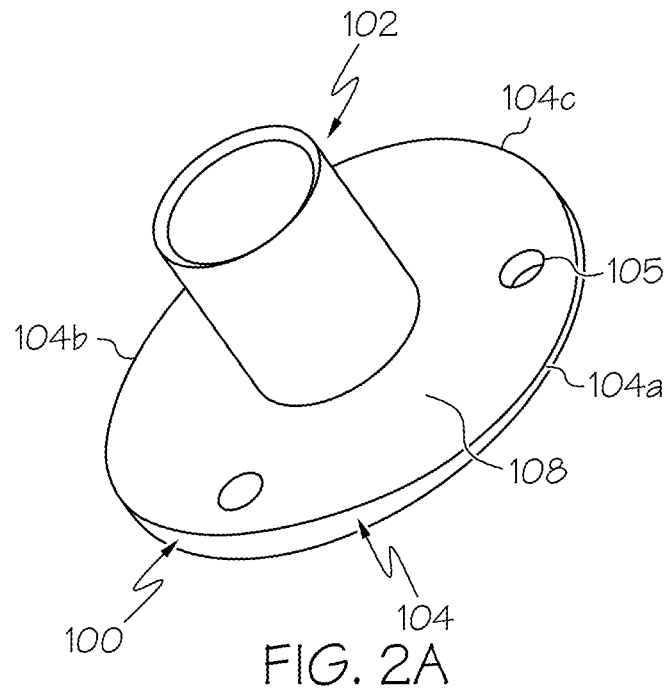
FIG. 2A is a perspective view of an insert for the combustor apparatus shown in FIG. 2.
Figure 2B:
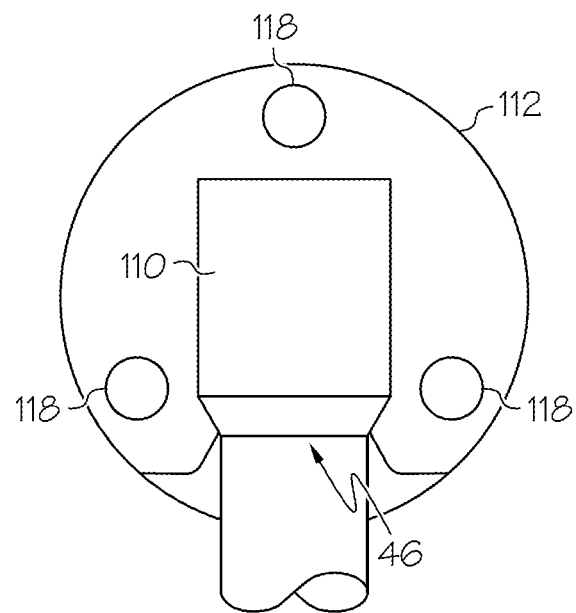
FIG. 2B is a plan view of a fuel feed block for the combustor apparatus shown in FIG. 2.

Referring to FIGS. 2, 2A and 2B, a third sealed coupling $SC_3$ in accordance with a first embodiment of the invention is shown. The third sealed coupling is provided by an engagement between the fuel feed block 46, an insert 100, and the inner face 23 of the outer wall 20. Specifically, the insert 100 includes a cylindrical insert sleeve 102 and a circular insert flange 104 extending radially outwardly from the insert sleeve 102. The insert sleeve 102 has an outer diameter sized to slide into the fuel inlet opening 64, and preferably has a diameter slightly less than the diameter of fuel inlet opening 64. The outlet portion 68 of the fuel feed pipe 62 may be received in the insert sleeve 102 in a slip fit or, alternatively, a threaded connection may be provided between the exterior surface of the outlet portion 68 and the interior surface of the insert sleeve 102.

The insert flange 104 is contoured to match the curvature of the inner face 23 of the outer wall 20. In particular, an inner face 106 of the insert flange 104 is contoured, i.e., curved, relative to a flat outer face 108 of the insert flange 104, such that opposing sides 104a, 104b of the insert flange 104 have a thinner thickness than a center section 104c of the insert flange 104. The insert flange 104 additionally includes a plurality of through holes 105.

The fuel feed block 46 includes a main body 110 and a flange portion 112 extending outwardly from the main body 110. The flange portion 112 has opposing sides defining inner and outer faces 114, 116 of the fuel feed block 46. As seen in FIG. 2B, the flange portion 112 additionally includes a plurality of holes 118 configured to align with the holes 105 in the insert flange 104. The outer wall 20 includes a plurality of threaded holes 119, and each of the threaded holes 119 is located to receive a respective bolt 122. The bolts 122 comprise a coupling fastener that engages the exterior surface 125 of the fuel feed block 46 and extends through the aligned holes 105, 118 to secure the fuel feed block 46 to the outer wall 20 with the insert flange 104 sandwiched therebetween to form the third sealed coupling $SC_3$.

Additionally, one or more seal members may be provided to junctions or interfaces formed between the fuel feed block 46, the insert 100, the outer wall 20 and the fuel feed pipe 62 to ensure that the fuel passing from the fuel feed pipe 62 to the fuel feed block 46 is contained by the third seal coupling $SC_3$. For example, in a preferred embodiment, a first seal ring 133a is provided between the feed block flange portion 112 and the insert flange 104, and a further or second seal ring 133b is provided between the insert flange 104 and the inner face 23 of the outer wall 20 to prevent contaminants from entering the fuel system from the outer wall 20. Alternatively, the insert 100 may sealed to the outer wall 20 at a first braze or weld joint 124a between an outer end of the insert sleeve 102 and the fuel inlet opening 64, and may be further sealed to the outer wall 20 at a second braze or weld joint 124b between the insert flange 104 and the inner face 23 of the outer wall 20. In alternative sealing configurations, one or more of the seal rings 133a, 133b could be used in combination with one or more of the weld joints 124a, 124b. For example, the first seal ring 133a could be used in combination with one or more of the weld joints 124a, 124b. Also alternatively, both the seal rings 133a, 133b could be used in combination with both the weld joints 124a, 124b.

In a further alternative or additional seal configuration, the fuel feed pipe 62 may be brazed or welded to the outer face 21 of the outer wall 20, as depicted at 129, to prevent fuel from leaking between the outer wall 20 and the fuel feed pipe 62. The weld 129 applied to the fuel feed pipe may also be used in combination with one or more of the ring seals 133a, 133b and/or the weld joints 124a, 124b.

It may be understood that FIG. 2 illustrates a continuous sealed passage for passage of fuel from the fuel feed pipe 62 to the fuel feed block 46. Additionally, the fuel feed pipe 62 extends partially through the fuel feed inlet into the insert 110, and the fuel feed block 46 is supported separately from the fuel feed pipe 62. The described configuration for a fuel feed assembly avoids formation of stresses within the fuel feed block 46, such as have been observed to occur in prior art fuel feed assemblies where a fuel feed pipe was coupled to an interior surface of a fuel feed block, e.g., at a load carrying threaded connection between an end of a fuel feed pipe and a threaded opening of a fuel feed block. In particular, the described fuel feed connection between the fuel feed block 46 and the fuel feed pipe facilitates connection of the different materials forming the fuel feed block 46 and the fuel feed pipe 62 in such a way that stresses due to differences in material hardness and coefficients of expansion of the materials is avoided.

Figure 3:
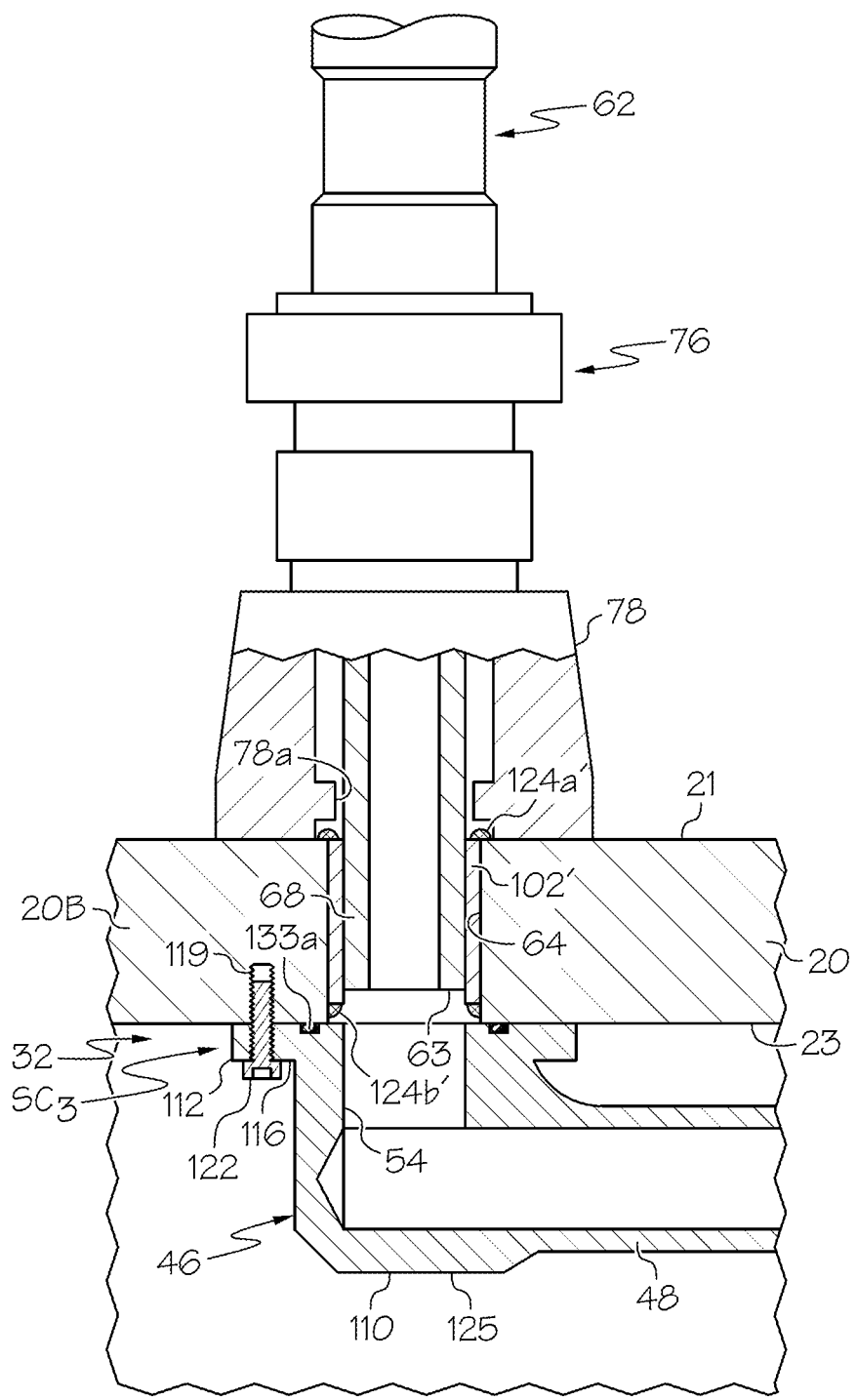
FIG. 3 is a side cross sectional view illustrating an alternative configuration of the combustor apparatus shown in FIG. 2.

FIG. 3 illustrates an alternative configuration of the structure shown in FIG. 2 in which similar components to those described for FIG. 2 are illustrated, except that an insert sleeve 102 forms the insert and the insert flange of FIG. 2 is removed. The insert sleeve 102 may be held in place by one or more welds, such as a weld 124a formed between the insert sleeve 102 and the outer face 21 of the outer wall 20 and/or a weld 124b formed adjacent to the inner face 23 of the outer wall 20 to seal the fuel passage from the outer wall 20. Alternatively, the insert sleeve 102 may be positioned within the fuel feed inlet 64 without being held in position by a weld. Further, a coupling member inner flange 78a extends inwardly over an outer end of the insert sleeve 102 such that, even if the weld 124 cracks or releases the insert sleeve 102, the insert will be trapped inside the fuel feed inlet 64 by the inner flange 78a and the inner face 114 of the fuel feed block 46.

As described above with reference to FIG. 2, the outlet portion 68 of the fuel feed pipe 62 may be received in the insert sleeve 102 in a slip fit or, alternatively, a threaded connection may be provided between the exterior surface of the outlet portion 68 and the interior surface of the insert sleeve 102. It may be understood that a threaded connection between the outlet portion 68 and the insert sleeve 102 may be used to facilitate holding the insert sleeve 102 in position in the event that a welded connection is not provided at either end of the insert sleeve 102.

Figure 4:
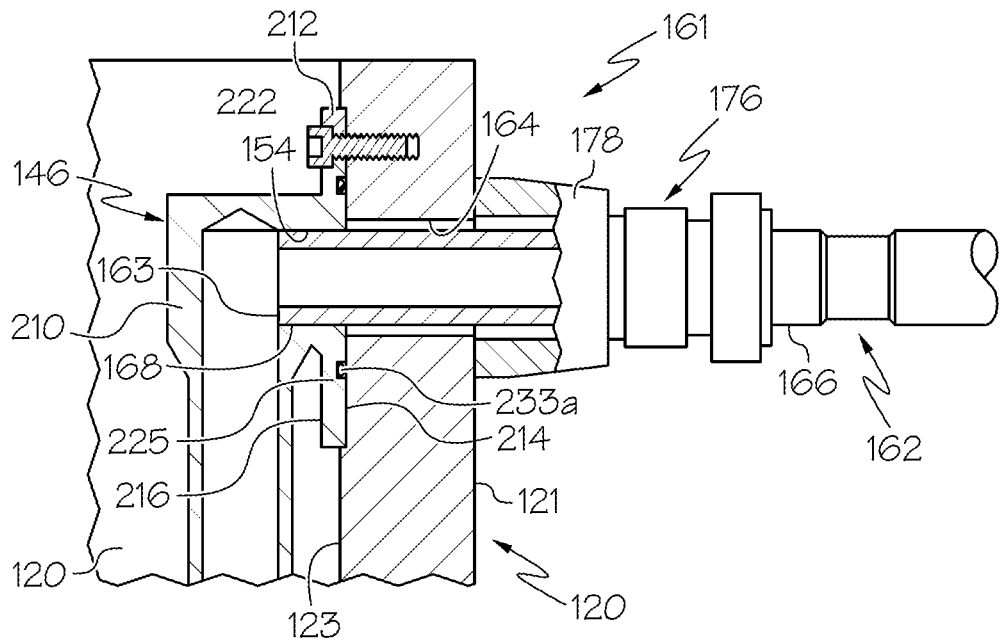
FIG. 4 is a side cross sectional view of a first alternative embodiment of the combustor apparatus.
Figure 4A:
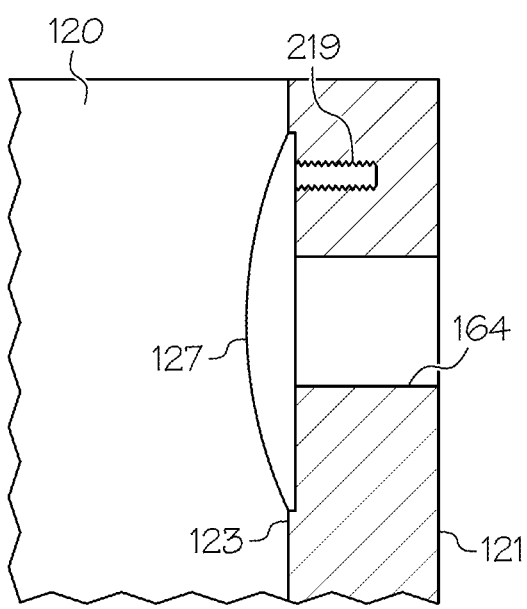
FIG. 4A is a cross sectional view of a portion of an outer wall of the embodiment of FIG. 4, illustrating a flattened wall portion for receiving a fuel feed block.

In one alternate embodiment illustrated in FIG. 4, wherein structure similar to that described above with reference to FIG. 2 has the same reference number increased by 100, the third sealed coupling $SC_3$ is formed without the insert 100. Specifically, the flange portion 204 of the fuel feed block 146 includes an inner face 214 that is directly engaged against the inner face 123 of the outer wall 120. As seen in FIG. 4A, in order to accommodate the flat surface of the inner face 214 of the fuel feed block 146 in a sealed interface, a portion of the inner face 123 of the outer wall 120 is ground to form a flat area 127 surrounding the fuel feed inlet 164 and sized to receive the flange portion 204 of the fuel feed block 146. A seal member, e.g., a sealing ring 233, may be provided between the feed block flange portion 212 and the inner face 123 of the outer wall 120 to ensure that the fuel passing from the fuel feed pipe 162 to the fuel feed block 146 is contained by the third seal coupling $SC_3$.

Additionally, as illustrated in FIG. 4, the outlet portion 168 of the fuel feed pipe 162 extends through the fuel feed inlet 164 and the fuel inlet passage 154 to locate the end 163 of the fuel feed pipe 162 within the fuel feed block 146. The fuel inlet passage 154 and the adjacent exterior surface of the fuel feed pipe 162 may be unthreaded, such that the fuel feed pipe 162 does not include features for creating stress concentrations between the interior of the fuel feed block 146 and the fuel feed pipe 162. However, it should be understood that the fuel inlet passage 154 and the adjacent exterior surface of the fuel feed pipe 162 may comprise cooperating threaded portions. In either case, the load carrying support for the fuel feed block 146 is provided by a coupling fastener defined by bolts 222 extending into threaded holes 219 in the outer wall 120, and the support for the fuel feed pipe 162 may be provided by a coupling assembly 161 comprising a fitting member 176 and coupling member 178 defining a sealed coupling structure, as described above with reference to FIG. 2.

Figure 5:
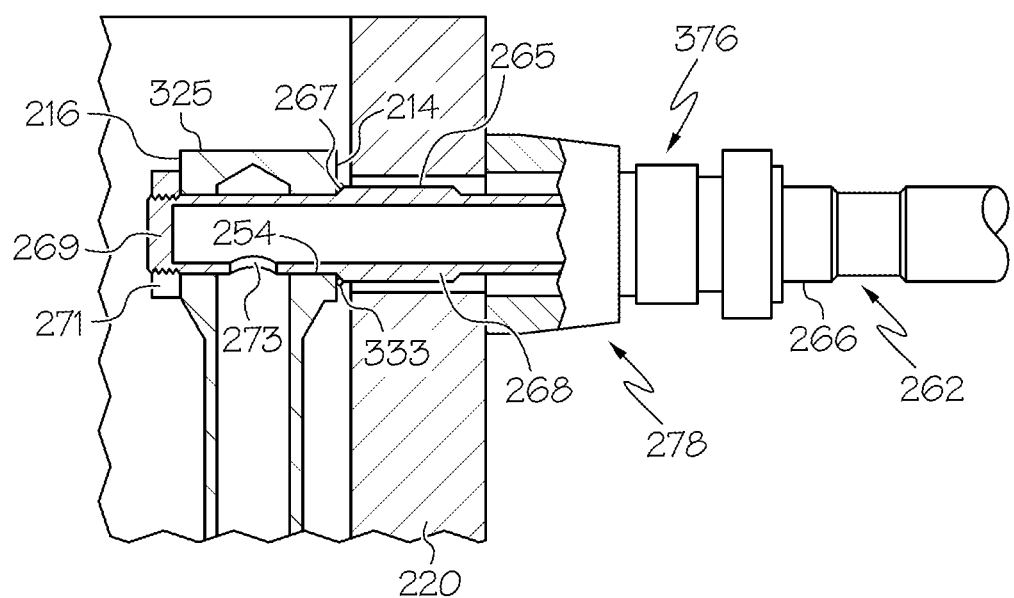
FIG. 5 is a side cross sectional view of a second alternative embodiment of the combustor apparatus.

In a second alternate embodiment illustrated in FIG. 5, wherein structure similar to that described above with reference to FIG. 2 has the same reference number increased by 200, the third sealed coupling $SC_3$ is formed on the outlet portion 268 of the fuel feed pipe 262. Specifically, the fuel feed pipe 262 includes an enlarged portion 265 defining a shoulder portion 267 extending radially outwardly to a diameter greater than the diameter of the fuel feed passage 254 for engaging against the exterior surface 325 at an inner face 314 of the fuel feed block 246 surrounding the fuel feed passage 254.

As seen in FIG. 5, the outlet portion 268 of the fuel feed pipe 262 extends through the fuel feed block 246, and includes a threaded end portion 269 on an exterior surface of the fuel feed pipe 262 adjacent to an outer face 216 of the fuel feed block 246. A coupling fastener comprising a threaded nut 271 is threadedly engaged on the threaded end portion 269 and is engaged on the outer face 216 of the fuel feed block 246 to bias the shoulder portion 267 into sealing engagement with the inner face 214 of the fuel feed block 246. Further, a seal member, such as a seal ring (not shown), may be positioned at the contact location between the shoulder portion 267 and the inner face 214 of the fuel feed block 246 to facilitate formation of the third sealed coupling $SC_3$ for containing fuel flowing from the fuel feed pipe 262 into the fuel feed block 246.

The nut 271 may tightened to a predetermined torque to stretch and provide a preload to the section of the fuel feed pipe 262 between the threaded end portion 269 and the shoulder portion 267 for maintaining a tight connection between the fuel feed pipe 262 and the fuel feed block 246. Locating the coupling fastener connection at the outer threaded end portion 269 of the fuel feed pipe 262 displaces the threaded portion away from the area of flexure of the fuel feed pipe 262. Additionally, the shoulder portion 267 is formed as a smooth radial extension from the smooth exterior of the fuel feed pipe 262, and preferably includes a radiused transition, such that stress concentration at the location of vibration induced loading, i.e., at the shoulder portion 267, is avoided or substantially reduced.

The support for the fuel feed pipe 262 may be provided by a coupling assembly 261 including a fitting member 276 and coupling member 278 defining a sealed coupling structure, as described above with reference to FIG. 2. The fuel feed pipe 262 provides a supporting structure for the fuel feed block 246 through the coupling fastener formed by the threaded nut 271 engaged on the threaded end portion 269.

It should be understood that the portion of the fuel feed pipe 262 extending through the fuel feed block 246, i.e., between the inner and outer faces 214, 216 of the fuel feed block 246, may be either non-threaded or threaded. The coupling to the fuel feed block 246 provided by the coupling fastener 269, 271 and the shoulder portion 267 provides the load carrying structure to avoid increased stress concentrations along sections of the pipe 262 within the fuel feed block 246 that may be subject to flexure, as discussed above, as well as at contact locations between the fuel feed pipe 262 and the fuel feed block 246. Additionally, an outlet opening 273 is formed in a portion of the fuel feed pipe 246 between the threaded end 269 and the shoulder portion 267 for providing a path for fuel flow from the fuel feed pipe 262 into the fuel feed block 246.

Figure 6:
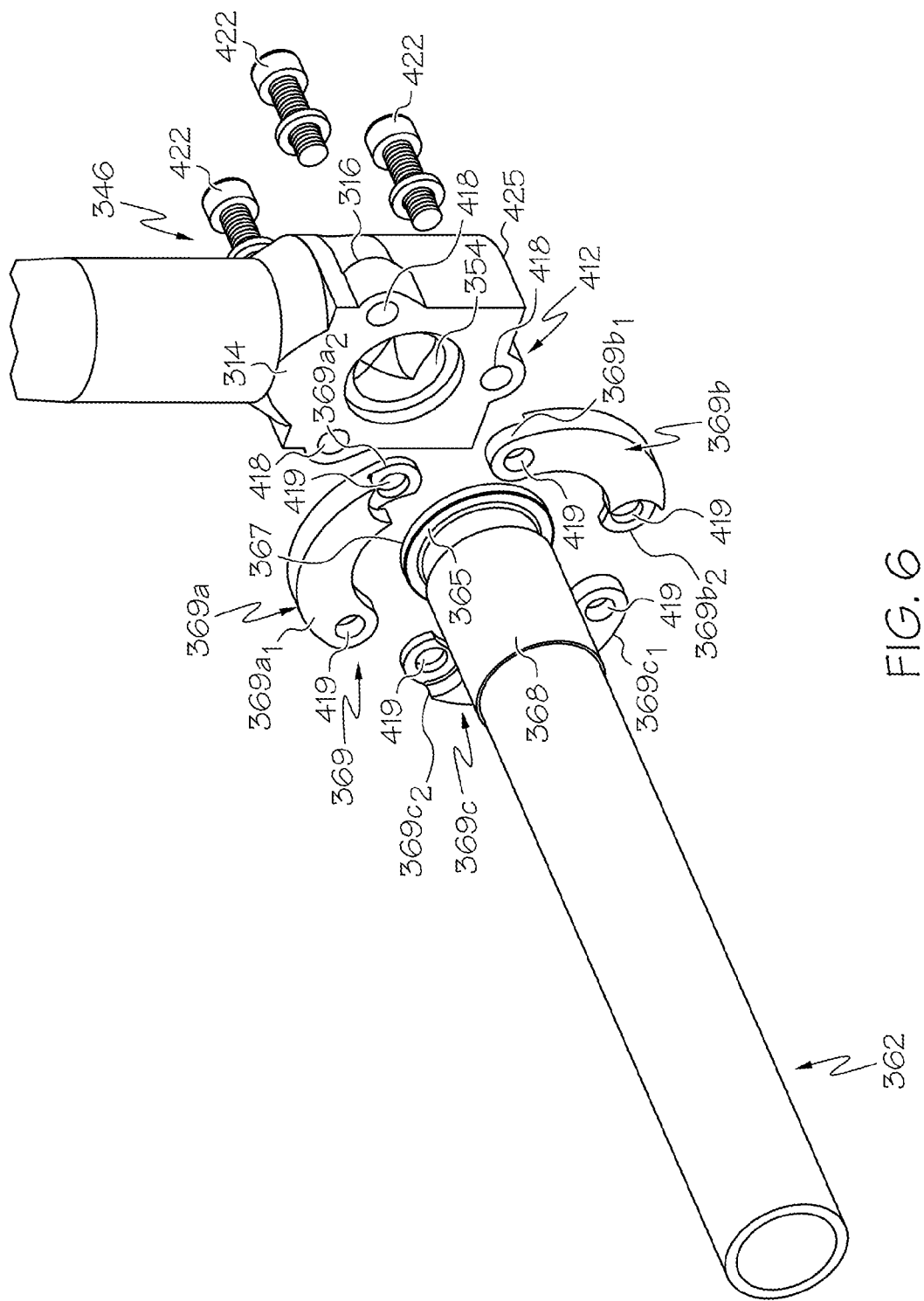
FIG. 6 is an exploded perspective view of a third alternative embodiment of the combustor apparatus.
Figure 6A:
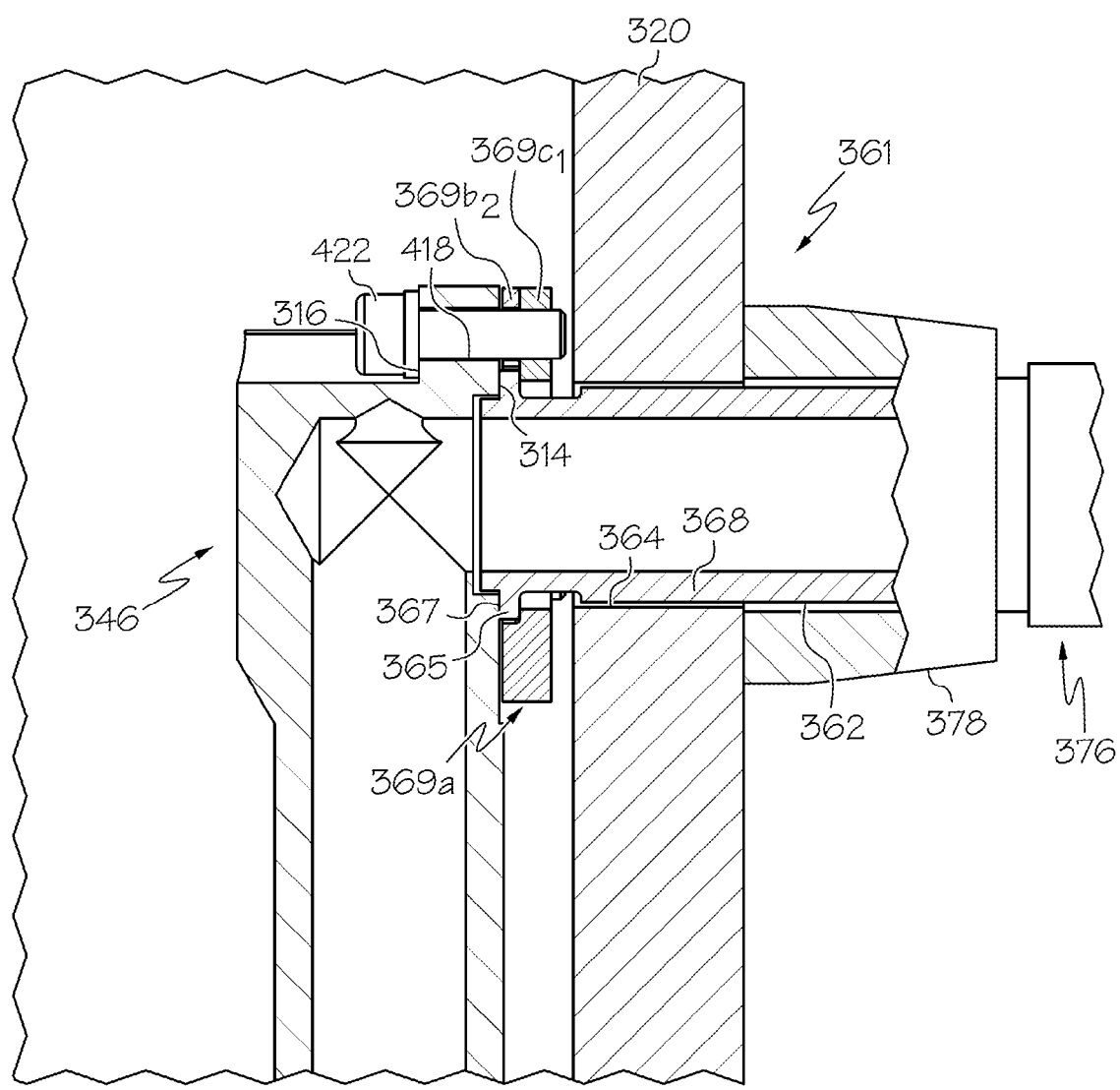
FIG. 6A is a side cross sectional view of the third alternative embodiment of the combustor apparatus.

In a third alternate embodiment illustrated in FIGS. 6 and 6A, wherein structure similar to that described above with reference to FIG. 2 has the same reference number increased by 300, the third sealed coupling $SC_3$ is formed on the outlet portion 368 of the fuel feed pipe 362. Specifically, the fuel feed pipe 362 includes an enlarged portion, illustrated herein as a fuel feed pipe flange 365, defining a shoulder portion 367 extending radially outwardly to a diameter greater than the diameter of the fuel feed passage 354 for engaging against the exterior surface 425 at an inner face 314 of the fuel feed block 346 surrounding the fuel feed passage 354.

The shoulder portion 367 is held in engagement with the fuel feed block 346 by a coupling fastener defined as a clamp assembly 369 held in clamping engagement by threaded bolts 422. Specifically, outwardly extending portions of the fuel feed block 346 comprise a flange portion 412 defining through holes 418 for receiving the bolts 422. The clamp assembly 369 includes three separable clamp portions 369a, 369b, 369c defining sectors of a circle that, when joined, form a ring encircling the fuel feed pipe 362 and define an opening having a diameter smaller than the diameter of the flange 365.

The clamp portion 369a includes respective ends $369a_1$, $369a_2$, the clamp portion 369b includes respective ends $369b_1$, $369b_2$, and the clamp portion 369c includes respective ends $369c_1$, $369c_2$. The respective ends of the clamp portions 369a, 369b, 369c, where they join to each other, are formed with a reduced thickness to permit the ends to overlap, and the ends are formed with threaded holes 419 for threadedly receiving respective bolts 422.

The threaded engagement of the bolts 422 in the holes 419 provides a clamping force biasing the clamp portions 369a, 369b and thereby the shoulder portion 367 of the flange 365 into engagement with the inner face 314 of the fuel feed block 346. Further, a seal member, such as a seal ring (not shown), may be positioned at the contact location between the shoulder portion 367 and the inner face 314 of the fuel feed block 346 to facilitate formation of the third sealed coupling $SC_3$ for containing fuel flowing from the fuel pipe 362 into the fuel feed block 346.

The support for the fuel feed pipe 362 may be provided by a coupling assembly 361 comprising a fitting member 376 and coupling member 378, having the structure described for the embodiment of FIG. 2 and defining a sealed coupling structure. The fuel feed pipe 362 provides a supporting structure for the fuel feed block 346 through the coupling fastener formed by the threaded bolts 422 engaged with the clamp portions 369a, 369b, 369c.

It should be understood that other coupling assemblies than the one described above may be provided for coupling the fuel feed pipe to the outer wall. For example, any of the above-described embodiments may utilize a weld or similar connection to couple the fuel feed pipe to the outer wall.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A combustor apparatus in a gas turbine engine, the combustor apparatus defining a combustion zone where air and fuel are burned to create high temperature combustion products, the combustor apparatus comprising:
   an outer wall including an inner face and an outer face, and defining an interior volume and comprising a fuel inlet opening;
   a fuel feed pipe that extends through the fuel inlet opening in the outer wall, the fuel feed pipe including an inlet portion and an outlet portion,
   a coupling assembly comprising:
      coupling structure on the outer face of the outer wall adjacent to the fuel inlet opening, the coupling structure comprising a threaded inner coupling portion;
      a fitting member disposed about and engaged with the inlet portion of the fuel feed pipe and comprising a threaded outer coupling portion, the threaded outer coupling portion being threadedly engaged with the inner coupling portion of the coupling structure to:
         create a first sealed coupling with the coupling structure; and
         secure the fuel feed pipe relative to the outer wall;
   a fuel injection system at least partially located in the interior volume of the outer wall and comprising fuel supply structure for providing fuel to at least one fuel injector that delivers fuel to be burned in the combustion zone, the fuel supply structure comprising a fuel feed block, the fuel feed block including:
      a fuel intake passage aligned with the outlet portion of the fuel feed pipe; and
      an exterior surface defining oppositely facing inner and outer faces, the inner face of the fuel feed block being located facing toward the inner face of the outer wall;
      a coupling fastener engaged against the outer face of the fuel feed block to:
         create a second sealed coupling adjacent to the outlet portion of the fuel feed pipe for containing fuel passing from the fuel feed pipe into the fuel feed block; and
         secure the fuel feed block relative to the coupling assembly, wherein the coupling fastener is threaded and is rotatable to thread inwardly in a direction from the outer surface toward the inner face of the fuel feed block to create the second sealed coupling,
      wherein the coupling fastener comprises a plurality of bolts, each bolt including a head engaged against the outer face of the fuel feed block and a threaded shank extending through a portion of the fuel feed block toward the outer wall.

2. The combustor apparatus of claim 1, wherein the fuel feed block includes a main body and a flange portion extending outwardly from the main body and having opposing sides defining the inner and outer faces of the fuel feed block, the flange portion includes a plurality of holes receiving the bolts.

3. The combustor apparatus of claim 2, wherein the outer wall includes a plurality of threaded holes, each of the threaded holes receiving a respective one of the bolts to secure the fuel feed block to the outer wall.

4. The combustor apparatus of claim 3, including an insert comprising an insert sleeve and an insert flange wherein the insert is positioned with the flange located between the fuel feed block and the outer wall, and with the sleeve extending through the fuel inlet opening from the inner face toward the outer face of the outer wall.

5. The combustor apparatus of claim 4, wherein a weld joint is formed between an outer end of the insert sleeve and the fuel inlet opening adjacent to the outer face of the outer wall to form a seal between the insert and the outer wall.

6. The combustor apparatus of claim 5, wherein the outlet portion of the fuel feed pipe terminates between the inner and outer faces of the outer wall.

7. The combustor apparatus of claim 3, wherein the outlet portion of the fuel feed pipe includes a non-threaded outer surface positioned through the fuel intake passage into the fuel feed block.

8. The combustor apparatus of claim 2, wherein the outlet portion of the fuel feed pipe includes a shoulder portion defined on a fuel feed pipe flange, the shoulder portion engaged against the inner face of the fuel feed block at the fuel feed passage to form a seal between the fuel feed pipe and the fuel feed block, and including a clamp assembly located between the fuel feed block and the outer wall and engaged against the fuel feed pipe flange, the clamp assembly including threaded holes receiving the bolts for securing the clamp assembly to the feed block.

9. The combustor apparatus of claim 8, wherein the clamp assembly includes a plurality of separable clamp portions that are positioned together to form a ring encircling the fuel feed pipe.

10. A combustor apparatus in a gas turbine engine, the combustor apparatus defining a combustion zone where air and fuel are burned to create high temperature combustion products, the combustor apparatus comprising:
  an outer wall including an inner face and an outer face, and defining an interior volume and comprising a fuel inlet opening;
  a fuel feed pipe that extends through the fuel inlet opening in the outer wall, the fuel feed pipe including an inlet portion and an outlet portion,
  a coupling assemble comprising:
    coupling structure on the outer face of the outer wall adjacent to the fuel inlet opening, the coupling structure comprising a threaded inner coupling portion;
    a fitting member disposed about and engaged with the inlet portion of the fuel feed pipe and comprising a threaded outer coupling portion, the threaded outer coupling portion being threadedly engaged with the inner coupling portion of the coupling structure to:
    create a first sealed coupling with the coupling structure; and
    secure the fuel feed pipe relative to the outer wall;
  a fuel injection system at least partially located in the interior volume of the outer wall and comprising fuel supply structure for providing fuel to at least one fuel injector that delivers fuel to be burned in the combustion zone, the fuel supply structure comprising a fuel feed block, the fuel feed block including:
    a fuel intake passage aligned with the outlet portion of the fuel feed pipe; and
    an exterior surface defining oppositely facing inner and outer faces, the inner face of the fuel feed block being located facing toward the inner face of the outer wall;
  a coupling fastener engaged against the outer face of the fuel feed block to:
    create a second sealed coupling adjacent to the outlet portion of the fuel feed pipe for containing fuel passing from the fuel feed pipe into the fuel feed block; and
    secure the fuel feed block relative to the coupling assembly;
    wherein the coupling fastener is threaded and is rotatable to thread inwardly in a direction from the outer surface toward the inner face of the fuel feed block to create the second sealed coupling,
    wherein the fuel feed pipe extends through the fuel feed passage in the fuel feed block and includes a threaded end extending outwardly adjacent to the outer face of the fuel feed block, and the coupling fastener is a threaded nut engaged on the threaded end, wherein the fuel feed pipe is in non-threaded engagement with the fuel feed block, and the fuel feed pipe further includes:
  a shoulder portion engaged against the inner face of the fuel feed block at the fuel feed passage to form a seal between the fuel feed pipe and the fuel feed block; and
  an outlet opening formed in the fuel feed pipe between the threaded end and the shoulder portion, the outlet opening providing a path for fuel flow from the fuel feed pipe into the fuel feed block.

11. A combustor apparatus in a gas turbine engine, the combustor apparatus defining a combustion zone where air and fuel are burned to create high temperature combustion products, the combustor apparatus comprising:
  an outer wall including an inner face and an outer face, and defining an interior volume and comprising a fuel inlet opening;
  a fuel feed pipe that extends through the fuel inlet opening in the outer wall, the fuel feed pipe including an inlet portion and an outlet portion;
  a coupling connection connecting the fuel feed pipe to the outer wall to:
    create a seal between the fuel feed pipe and the outer wall; and
    secure the fuel feed pipe relative to the outer wall;
  a fuel injection system at least partially located in the interior volume of the outer wall and comprising fuel supply structure for providing fuel to at least one fuel injector that delivers fuel to be burned in the combustion zone, the fuel supply structure comprising a fuel feed block, the fuel feed block including:
    a main body and a flange portion extending outwardly from the main body and having opposing sides defining inner and outer faces of the fuel feed block, the flange portion further including a plurality of holes; and
    a fuel intake passage formed in the main body and aligned with the outlet portion of the fuel feed pipe;
  a plurality of threaded holes extending into the outer wall from the inner face thereof;
  a plurality of bolts extending through the holes in the flange portion of the fuel feed block into engagement with the threaded holes to:
    create a sealed coupling adjacent to the outlet portion of the fuel feed pipe for containing fuel passing from the fuel feed pipe into the fuel feed block; and
    secure the fuel feed block to the outer wall,
    wherein each bolt includes a head engaged against the outer face of the fuel feed block and a threaded shank extending through a portion of the fuel feed block toward the outer wall.

12. The combustor apparatus of claim 11, including an insert comprising an insert sleeve extending through the fuel inlet opening, and wherein the outlet portion of the fuel feed pipe extends into the insert sleeve and terminates between the inner and outer faces of the outer wall.

13. The combustor apparatus of claim 11, wherein the outlet portion of the fuel feed pipe includes a non-threaded outer surface positioned through the fuel intake passage into the fuel feed block.

14. A combustor apparatus in a gas turbine engine, the combustor apparatus defining a combustion zone where air and fuel are burned to create high temperature combustion products, the combustor apparatus comprising:
  an outer wall including an inner face and an outer face, and defining an interior volume and comprising a fuel inlet opening;
  a fuel feed pipe that extends through the fuel inlet opening in the outer wall, the fuel feed pipe including an inlet portion and an outlet portion, and a shoulder portion extending outwardly from the outlet portion;
  a coupling connection connecting the inlet portion of the fuel feed pipe to the outer wall to:
    create a seal between the fuel feed pipe and the outer wall; and
    secure the fuel feed pipe relative to the outer wall;

a fuel injection system at least partially located in the interior volume of the outer wall and composing fuel supply structure for providing fuel to at least one fuel injector that delivers fuel to be burned in the combustion zone, the fuel supply structure comprising a fuel feed block, the fuel feed block including:
   a fuel intake passage aligned with the outlet portion of the fuel feed pipe; and
   an exterior surface defining oppositely facing inner and outer faces, the inner face of the fuel feed block being located facing toward the inner face of the outer wall;
a coupling fastener engaged against the outer face of the fuel feed block and providing a clamping force at a junction between the shoulder portion on the fuel feed pipe and the inner face of the fuel feed block at the fuel intake passage to:
   create a sealed coupling adjacent to the outlet portion of the fuel feed pipe for containing fuel passing from the fuel feed pipe into the fuel feed block; and
secure the fuel feed block relative to the fuel feed pipe, wherein the shoulder portion is defined on a fuel feed pipe flange extending outwardly from the outer end of the outlet portion of the fuel feed pipe, and the coupling fastener comprises a plurality of bolts extending through the fuel feed block from the outer to the inner face thereof, and including a clamp assembly located between the fuel feed block and the outer wall and engaged against the flange portion, the clamp assembly includes a plurality of separable clamp portions that are positioned together to form a ring encircling the fuel feed pipe clamp, and including threaded holes receiving the bolts to:
   engage the shoulder portion of the fuel feed pipe against the inner face of the fuel feed block; and
   secure the clamp portions to the fuel feed block.

15. The combustor apparatus of claim 14, wherein the fuel feed pipe extends through a feed passage in the fuel feed block and the fuel feed pipe includes:
   a threaded end portion extending outwardly adjacent to the outer face of the fuel feed block, and the coupling fastener is a threaded nut engaged on the threaded end portion; and
   a non-threaded portion along a portion of the fuel feed pipe extending a length defined from the inner face to the outer face of the fuel feed block.

16. The combustor apparatus of claim 15, wherein the fuel feed pipe further includes an outlet opening formed in the fuel feed pipe between the threaded end and the shoulder portion, the outlet opening providing a path for fuel flow from the fuel feed pipe into the fuel feed block.

* * * * *